No. 631,838. Patented Aug. 29, 1899.
T. C. WITHERSPOON.
WATER HEATER OR ANALOGOUS DEVICE.
(Application filed Sept. 6, 1898.)
(No Model.) 2 Sheets—Sheet 1.
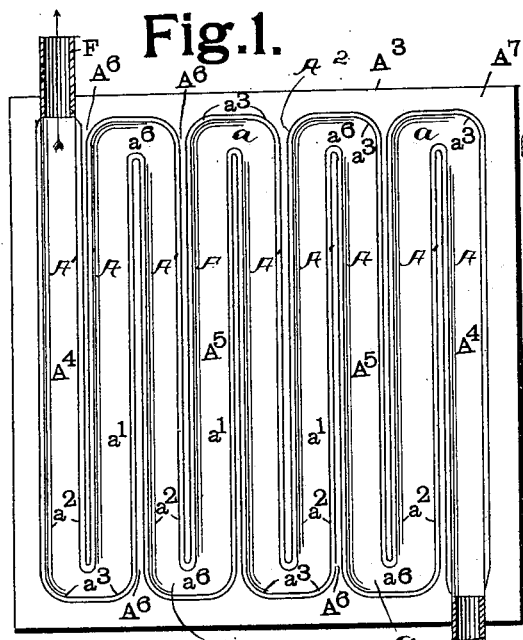
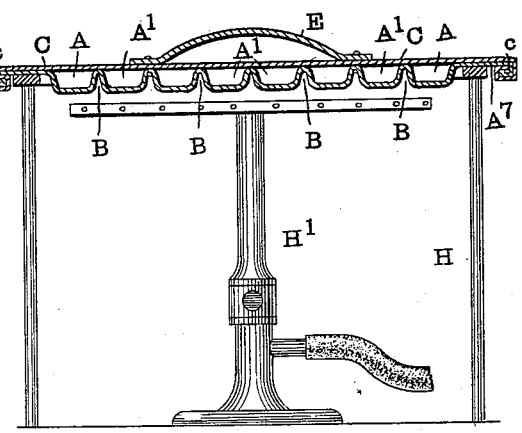
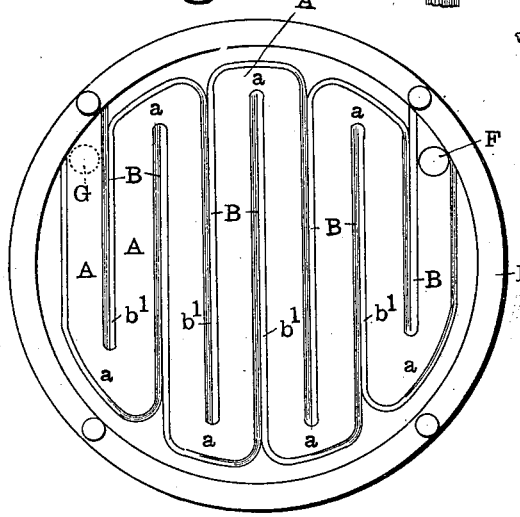
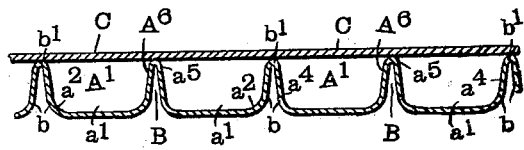
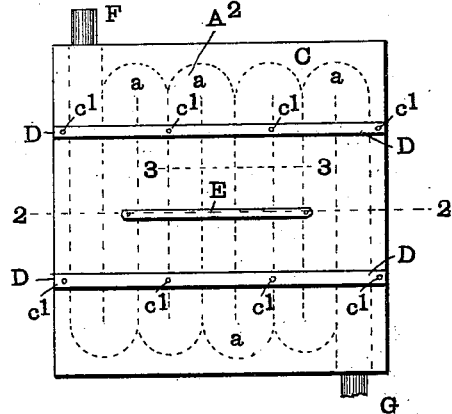
Witnesses
W. H. Alexander
A. D. Cunningham
Inventor
Thomas C. Witherspoon
By Attorney
Benj. T. Rye
THE NORRIS PETERS CO., PHOTO-LITHO., WASHINGTON, D. C.

No. 631,838. Patented Aug. 29, 1899.
T. C. WITHERSPOON.
WATER HEATER OR ANALOGOUS DEVICE.
(Application filed Sept. 6, 1898.)

(No Model.) 2 Sheets—Sheet 2.

Witnesses
Inventor
Thomas C. Witherspoon
By Attorney

UNITED STATES PATENT OFFICE.

THOMAS C. WITHERSPOON, OF ST. LOUIS, MISSOURI.

WATER-HEATER OR ANALOGOUS DEVICE.

SPECIFICATION forming part of Letters Patent No. 631,838, dated August 29, 1899.

Application filed September 6, 1898. Serial No. 690,327. (No model.)

*To all whom it may concern:*

Be it known that I, THOMAS C. WITHERSPOON, a citizen of the United States, residing at St. Louis, in the State of Missouri, have invented certain new and useful Improvements in Water-Heaters and Analogous Devices, of which the following is a specification.

My invention relates to both portable and stationary water-heaters and analogous devices; and its chief objects are, first, to provide a water-heater which will heat water more rapidly and economically than the water-heaters now in use with which I am acquainted, and, second, to provide a water-heater which while it can be constructed cheaply will be strong and durable. I attain these objects by means of the improvements illustrated in the annexed drawings, in which—

Figure 6:
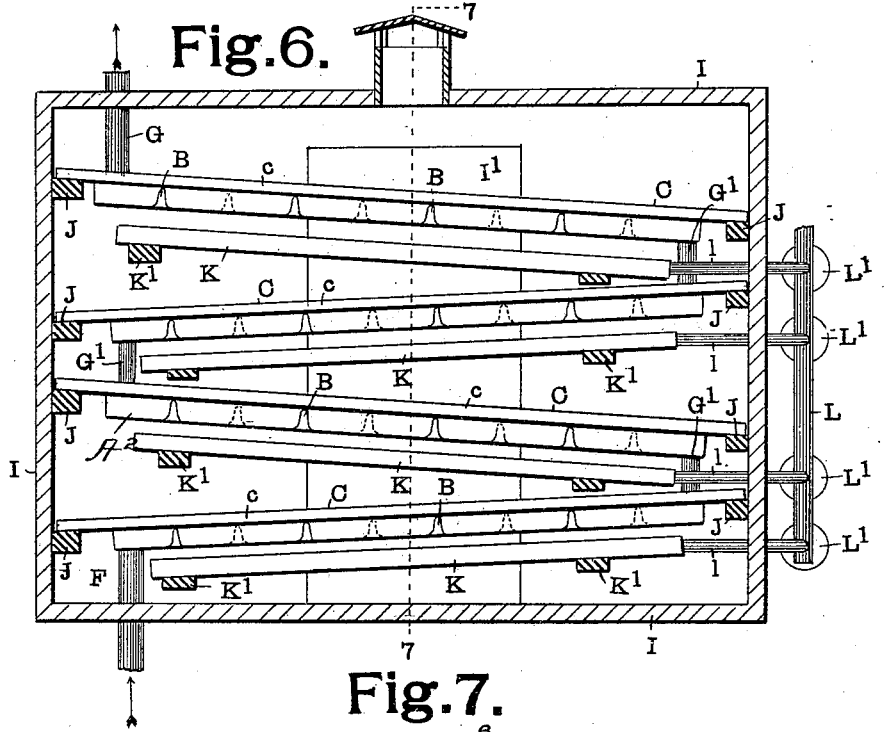

Figure 1 is a plan view of a portable water-heater with the top removed. Fig. 2 is a vertical cross-section of a portable water-heater on line 2 2 of Fig. 4. Fig. 3 is a detailed vertical cross-section on line 3 3, Fig. 4. Fig. 4 is a plan view, on a reduced scale, of the heater illustrated in the preceding view. Fig. 5 is an inverted plan view of a modification. Fig. 6 is a vertical longitudinal section of a stationary water-heater embodying my improvements on line 6 6, Fig. 7; and Fig. 7 is a vertical cross-section on line 7 7, Fig. 6.

Similar letters refer to similar parts throughout the several views.

Figure 7:
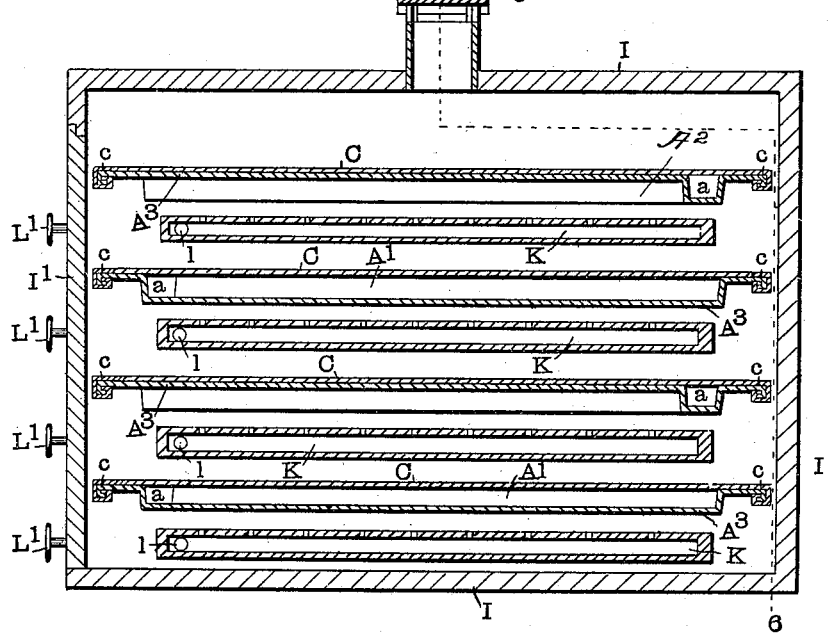

My improved water-heater may either contain a single set of tubes A and A', connected together, so as to form a serpentine or zigzag series $A^2$, open from end to end, substantially as shown in Figs. 1 to 5, inclusive, or several such serpentine or zigzag series of tubes arranged one series above the other, as shown in Figs. 6 and 7. The tubes of each series are preferably parallel except at their ends. Each of the outside tubes A preferably bends inward at its inner end and forms a junction $a$ with the tube next it, and the inner tubes A' each preferably bends to the right at one end and to the left at the other and forms junctions $a$ with the tubes on each side of it, substantially as shown. This particular method of connecting the tubes A and A' so as to form the desired series is not essential, though it is desirable.

Each series $A^2$ of tubes A and A' is preferably formed substantially as follows: I first take a sheet $A^3$ of suitable metal and form therein, preferably by stamping or otherwise, a series of open-topped channels $A^4$ and $A^5$, preferably parallel except at their ends, and whose bottoms $a'$ are preferably flat both externally and internally, except at the side corners $a^2$ and the ends $a^3$, and whose sides $a^4$ preferably slope upward and outward, and except the outer sides of the outside channels $A^4$ meet the adjoining sides of the adjoining channels at apexes $a^5$ of ridges $A^6$, which they form. The apexes of said ridges are preferably either angular or rounded in cross-section. At their inner ends each of the outside channels $A^4$ preferably extends inward and forms a junction $A^6$ with the inner channel $A^5$ next it, and the inner channels $A^5$ each preferably bends to the right at one end and to the left at the other and forms a junction $a^6$ at each end with adjoining channels. Where the tubes A and A' do not form their junctions in the manner above described, the form of the channels $A^4$ and $A^5$ have to be varied accordingly. I prefer to make the depth of each channel about one-half its greatest width, as in that way I secure a very large heating-surface; but I do not limit myself to any proportions. Around the series of channels $A^4$ and $A^5$, I preferably leave an outwardly-projecting flange $A^7$ flush with the apexes $a^5$ of the ridges $A^6$. By forming the channels $A^4$ and $A^5$ in the manner described and leaving the ridges $A^6$ between them I incidentally form in the under side of the sheet $A^3$ a series of grooves or channels B, extending up between the channels $A^4$ and $A^5$ and which correspond in form and position to the ridges $A^6$, of which they form the reverse or under side. The sides $b$ of said channels B preferably flare outward and at the bottoms $b'$ of said channels preferably approach each other. Having thus formed a serpentine or zigzag series of channels $A^4$ and $A^5$ in one side of the plate $A^3$ and formed on the under side the series of channels B, I next close the tops of the channels $A^4$ and $A^5$ and complete the series of tubes A and A' by fastening to the face of the plate A³ a metal plate C, which is preferably flat and preferably rests upon the flange A⁷ and the apexes a⁵ of the ridges A⁶ and other portions of the plate left flush therewith, and I preferably fasten the sheets together in any convenient manner—as, for instance, by joining the edges of the plates A³ and C by a waterproof seam c and passing a few rivets c' through the plates at points where the plate C is in contact with the ridges A⁶ or the flange A⁷. It is not essential that water-tight joints shall be formed between the plate C and the ridges A⁶, though it is desirable that they should be in contact with each other, so as to force most, if not all, the water passing through the heater when it is in use to follow the course of the channels A⁴ and A⁵.

When the plate A³ is given the form described, its body is sufficiently stiff along lines parallel with the channels A⁴ and A⁵ to contribute all necessary stiffness to the finished device along said lines, but at right angles to said channels it is desirable in the case of portable water-heaters to stiffen the device by means of metal reinforcing-strips D, Fig. 4, held in place by rivets passing through the plates A³ and C.

Where the heater is designed to be portable, I preferably rivet a suitable handle E to the top.

Where a single series A² of tubes A and A' is used, I preferably connect to the outer end of one of the tubes A a tube F, adapted for use in connecting the water-heater with a source of water-supply, and to the outer end of the other tube A of the series I preferably connect a faucet G.

In Figs. 1 and 4 the tube F and faucet G are each shown extending directly outward from the end of the tube A with which it connects; but, as will be obvious, they may connect either with the top or the bottom of a tube A, as shown in Figs. 5, 6, and 7.

In Figs. 1, 4, 6, and 7 rectangular water-heaters are illustrated, but there is no difficulty about making them circular, as shown in Fig. 5, or in giving them any other desired shape.

In Figs. 2 and 5 the water-heater is shown resting upon a support H of common form, which, however, embodies no part of my invention.

In Fig. 2 an ordinary Bunsen gas-burner H' is shown below the heater. I have found the Bunsen gas-burner very efficient in connection with the water-heater described, and my water-heater is especially designed for use in connection with a gas-burner of some suitable form.

In the case of stationary heaters designed for heating a large quantity of water and in which several series A² of tubes are used each series of tubes is preferably substantially like those illustrated in Figs. 1 to 5, inclusive, and I preferably place them within a suitable casing I, Figs. 6 and 7. In such cases I preferably arrange each series of tubes so that the discharge end will be higher than the end at which water is admitted and so that the individual tubes A and A' will be substantially horizontal except at the ends thereof, substantially as shown in Figs. 6 and 7. The zigzag arrangement shown in the drawings is the one preferred. In such cases the connecting-tubes G' are preferably substantially vertical and lead from the outer end of the uppermost tube A of one series to the outer end of a lowermost tube A of the series next above it. Each series preferably rests upon cleats J, secured to the inside of the casing I, and each is preferably supplied with a suitable Bunsen or other gas-burner K, arranged beneath it and shown resting upon brackets K'. The burners are shown connected to a main pipe L by pipes l, and each is preferably provided with a cock L', which may be of any known form. The casing I is preferably provided with a suitable door I', adapted to afford access to its interior. A large apparatus of this kind is well adapted to furnish a sufficient quantity of hot water to heat a dwelling.

When water is to be heated by means of a water-heater embodying my invention, the water is preferably allowed to pass through the heater in a continuous stream and should be turned on before the gas is lighted. When the burner is lighted, the intensely-hot flame arising from it plays upon the substantially flat bottoms of the tubes A and A' and passes thence up between the channels A⁴ and A⁵, and thus comes in contact with an unusually-large heating-surface in proportion to the amount of water in the tubes, and the heat generated in the burner is transmitted very quickly and with very little loss to the water in the heater, so that water entering cold is heated hot by the time it reaches its outlet. By reason of the form of the channels B the flames from a burner are able to enter them freely, while the bottoms of said channels are protected from burning out by their form and the fact that water is present on both sides of each of the channels up to the apex a⁵ of the ridges A⁶.

I claim—

1. In a water-heater a water-heating tube consisting of a sheet of metal stamped to form a series of open-topped channels with substantially flat bottoms internally and externally with inclined sides and rounded junctions of the same with the bottoms, the said sides inclining outwardly and the adjacent sides of two adjacent channels forming apexes or rounded ridges, the channels at their ends extending in opposite directions at opposite ends and joining with the adjacent ends of the next adjacent channels, the plate thus stamped forming channels on the under side between the sloping sides of the above-mentioned channels, and a plate resting upon the apexes of the ridges and joined to the edge of the stamped plate by a waterproof seam and rivets, all substantially as shown and described.

2. In a water-heater a water-heating tube consisting of a metal plate stamped to form a series of open-topped channels with substantially flat bottoms internally and externally with inclined sides and rounded junctions of the same with the bottoms, the said sides inclining outwardly and the adjacent sides of two adjacent channels forming apexes of ridges, the channels at their ends extending in opposite directions at opposite ends, the plate thus stamped forming channels on the under side between the sloping sides of the above-mentioned channels and extending to the said apexes, a plate resting on the apexes of the ridges and joined around the edge of the stamped plate by a waterproof seam, and reinforce-strips arranged at right angles to the length in the channels and secured to the stamped plate and top plate by means which serve to secure the two plates together at the said seam, all substantially as shown and described.

THOMAS C. WITHERSPOON.

Witnesses:
ARTHUR W. REHFELDT,
BENJ. F. REX.